United States Patent
LeMole

(10) Patent No.: US 6,711,783 B2
(45) Date of Patent: Mar. 30, 2004

(54) ANTI-PINCH KNUCKLE FOR BIDIRECTIONAL SLEEVE

(76) Inventor: John M. LeMole, 354 Broadway, Rockland, ME (US) 04841

(*) Notice: Subject to any disclaimer, the term of this patent is extended or adjusted under 35 U.S.C. 154(b) by 185 days.

(21) Appl. No.: 10/085,922

(22) Filed: Feb. 28, 2002

(65) Prior Publication Data

US 2003/0086752 A1 May 8, 2003

Related U.S. Application Data

(63) Continuation-in-part of application No. 09/190,350, filed on Nov. 12, 1998, now Pat. No. 6,353,969.
(51) Int. Cl.[7] .......................... F16C 11/10; B63B 17/00
(52) U.S. Cl. ......................... 16/352; 403/102; 403/161; 114/361
(58) Field of Search ............................ 16/352; 403/102, 403/161, 157, 101; 5/121, 113, 99.1; 114/361

(56) References Cited

U.S. PATENT DOCUMENTS

| | | | |
|---|---|---|---|
| 1,906,218 A | * 4/1933 | Patchell | 403/100 |
| 4,865,064 A | * 9/1989 | Parsons et al. | 135/68 |
| 5,178,583 A | * 1/1993 | Rankin | 464/114 |
| 5,217,315 A | * 6/1993 | Rosane | 403/102 |
| 5,431,508 A | * 7/1995 | Kitamura | 403/325 |
| 5,743,208 A | * 4/1998 | Miller | 114/361 |
| 5,803,104 A | * 9/1998 | Pollen | 135/96 |

* cited by examiner

Primary Examiner—Anthony Knight
Assistant Examiner—Enoch Peavey

(57) ABSTRACT

An articulating strut capable of assuming an extended in-line and a folded configuration with rigid cylindrical tubing having proximate ends configured to fixably receive an offset hinged insert that provides for folding and unfolding of said strut. When fully unfolded the strut acts as a single rigid structural support member held in the locked position by a bidirectional slidable locking sleeve. The hinged insert has shapes and curved surfaces which together with offset hinge pins tends to expel the sleeve from a pinch possibility at the folding joint. Convex and concave linkage shapes together with rounded surfaces which bear against a rounded sleeve end avoids sleeve pinch.

24 Claims, 11 Drawing Sheets

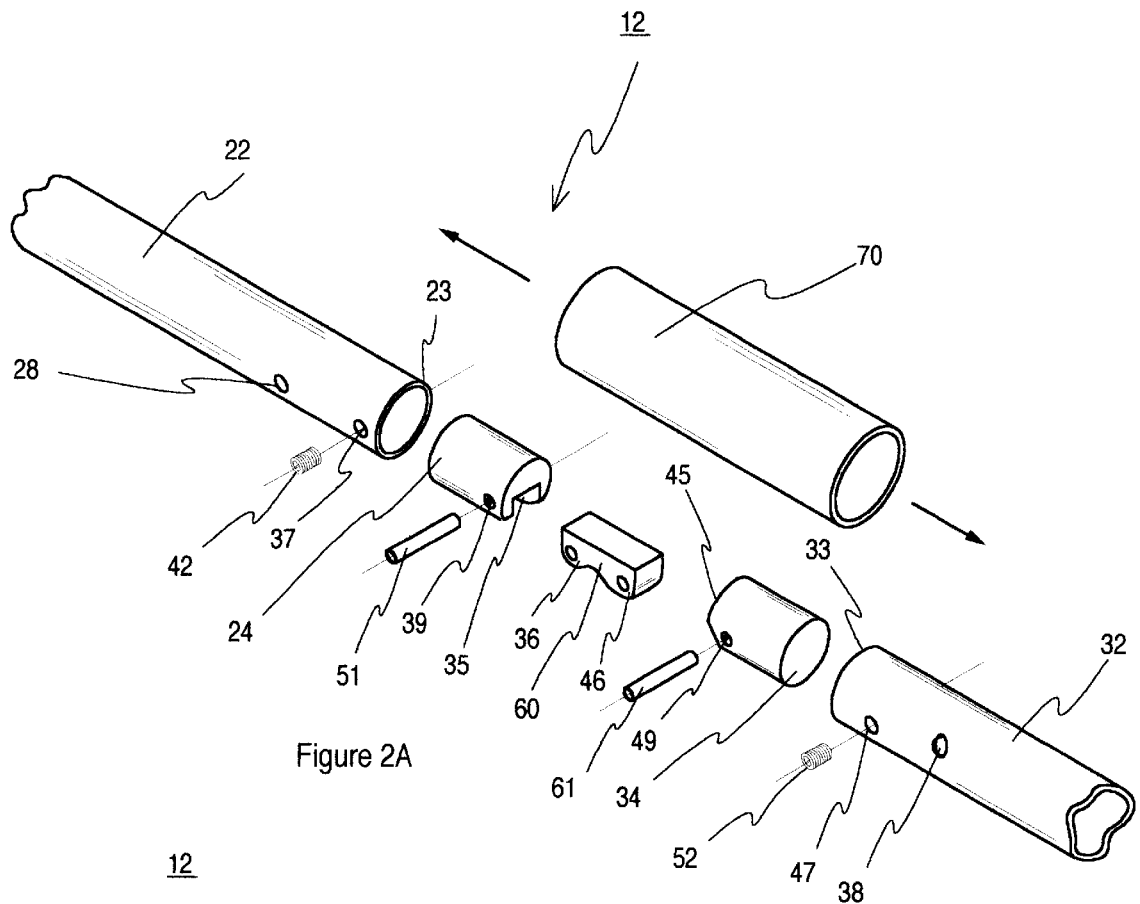
Figure 2A
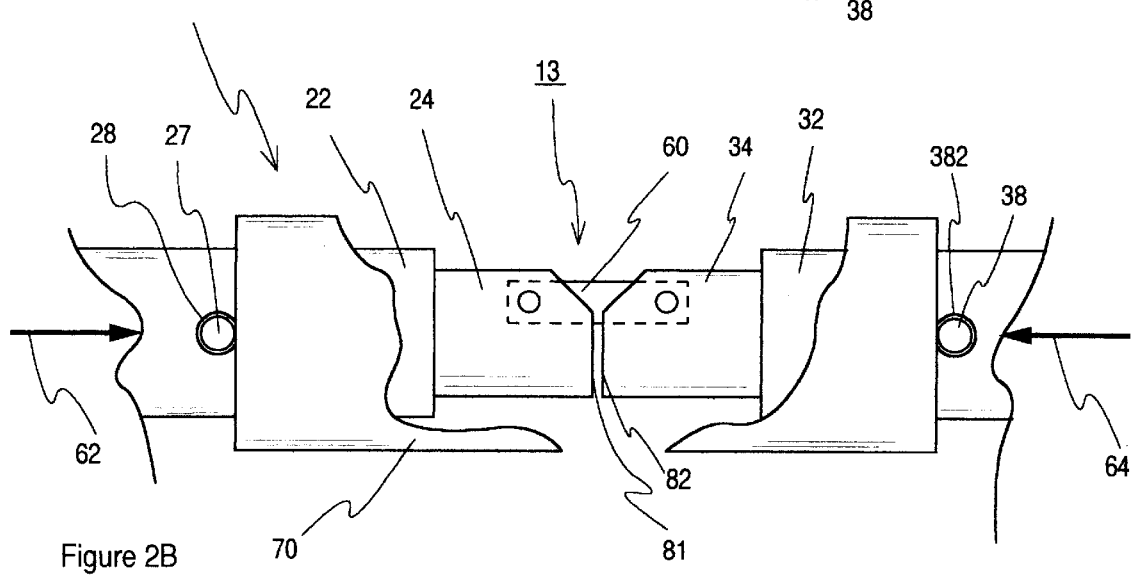
Figure 2B
Figure 2

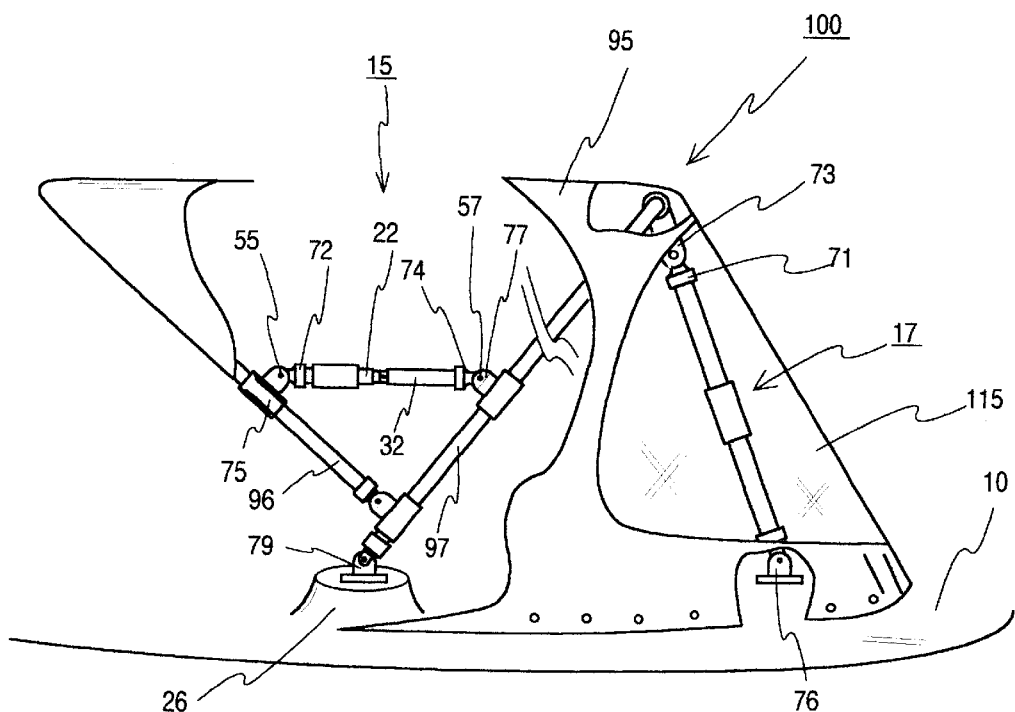
Figure 3A
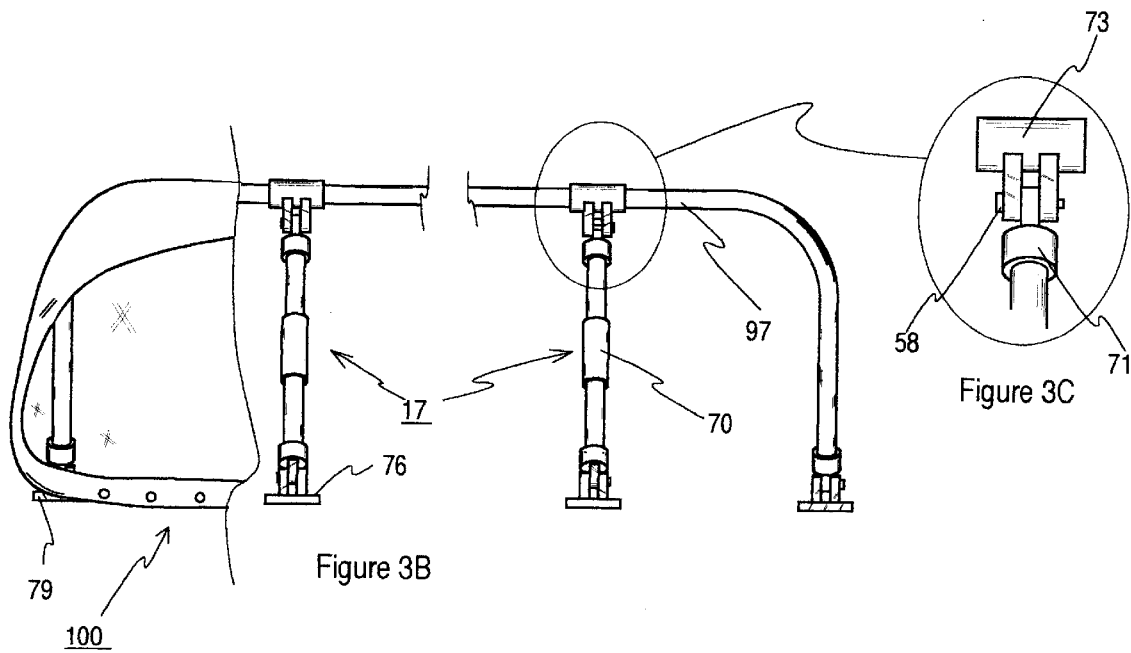
Figure 3B
Figure 3C
Figure 3

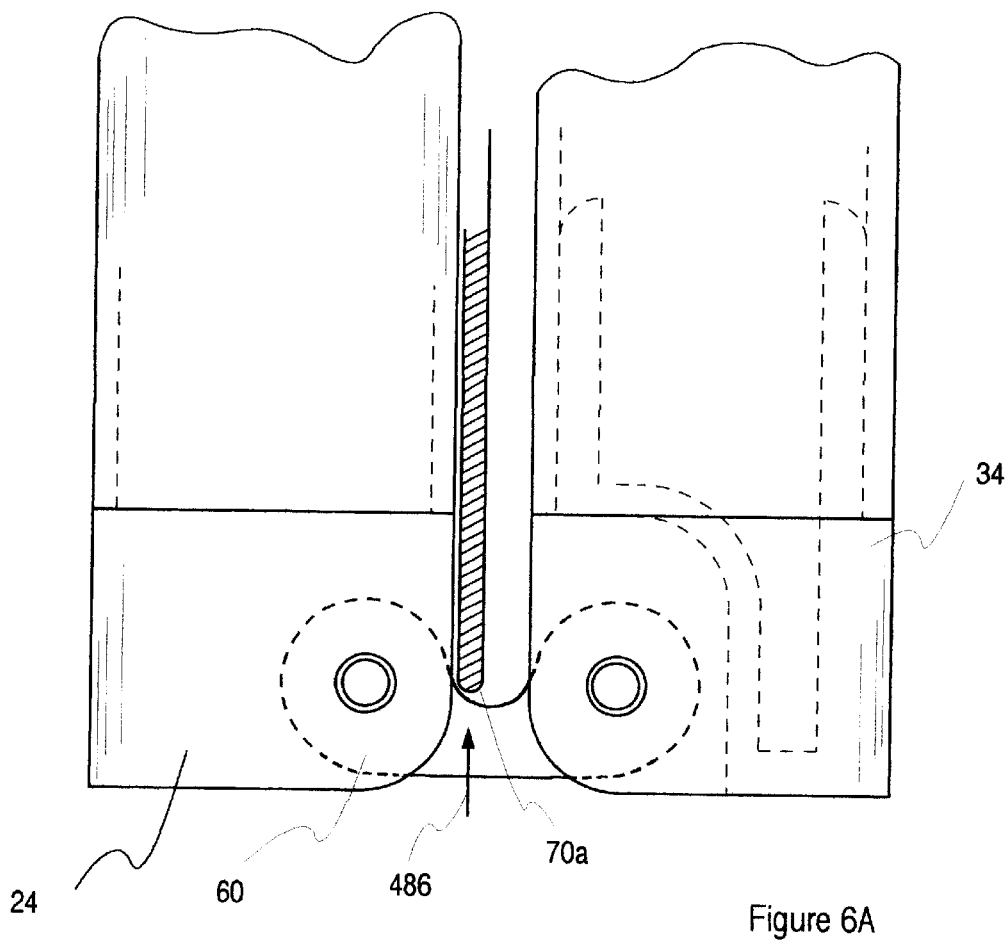
Figure 6A
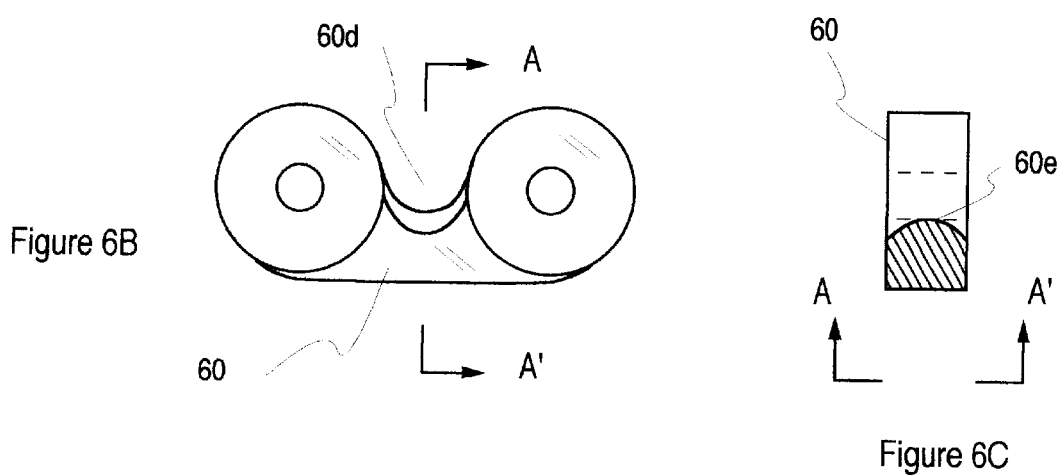
Figure 6B
Figure 6C
Figure 6

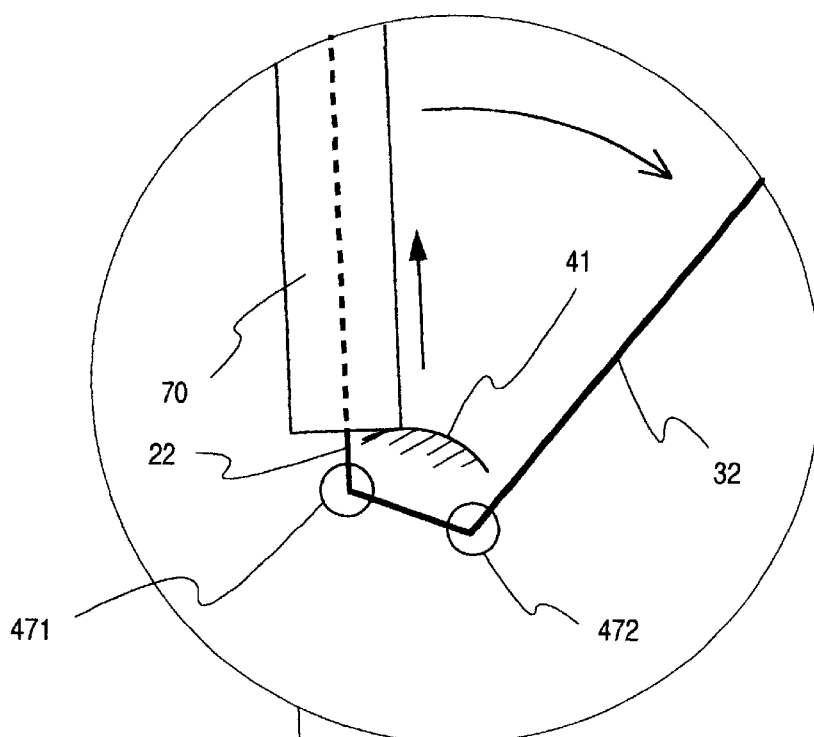
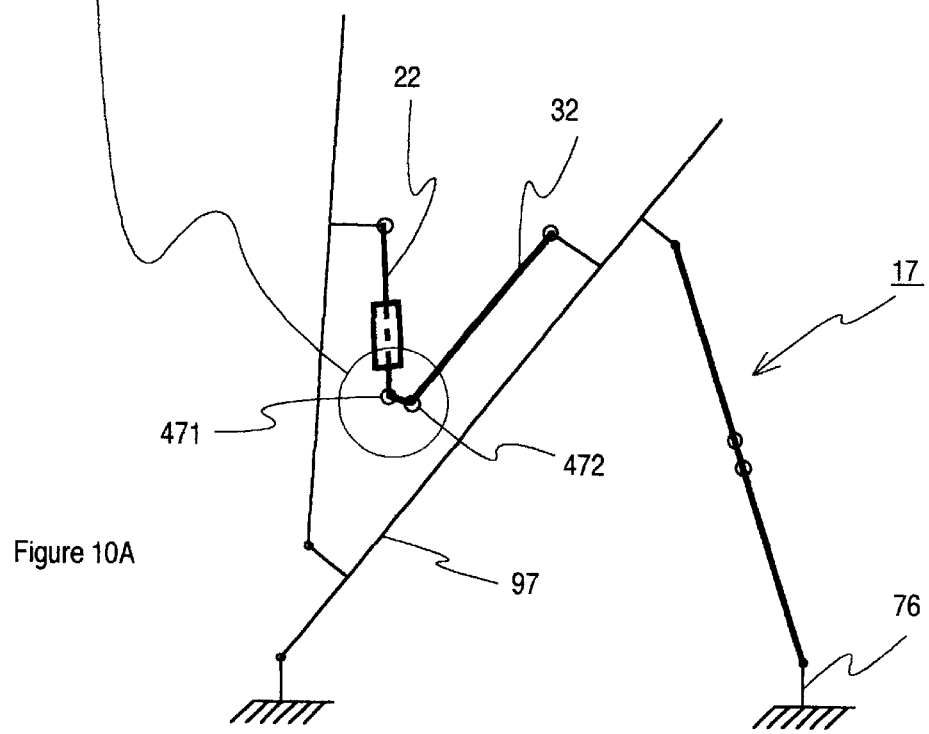
Figure 10B
Figure 10A
Figure 10

ANTI-PINCH KNUCKLE FOR BIDIRECTIONAL SLEEVE

RELATED PATENT APPLICATIONS

This is a continuation in part of my U.S. application Ser. No. 09/190,350 entitled DETENT LATCHING, BIDIRECTIONAL STRUT WITH OFFSET HINGED INSERTS filed on Nov. 12, 1998, now U.S. Pat. No. 6,353,969.

The above-identified pending parent application is hereby incorporated by reference in full as if set forth herein at this point. For brevity sake, however, certain material from the parent is not physically carried forth into the specification of this continuing application. Reference to the soon-to-issue patent may be made for such material if the need should arise.

FIELD OF THE INVENTION

The present invention relates to an articulating support strength member. More particularly, the field of this strut invention relates to a support member used in—but not limited to—the flexible coverings field with particular emphasis on marine canvas, vinyl and similar synthetic materials.

Additionally the field relates to an articulating knuckle insert compatible with industry standard marine grade structural tubing. Further, my field of invention relates to inserts at a strut joint which have an anti-pinch configuration for positively moving the bidirectional sleeve away from the folding joint and thus assuring freedom of folding without damage to related structure.

EXPLANATION OF TERMS

Certain terms are used to introduce and explain the background of the art and the invention; and, for convenience and completeness sake, such terms are summarized in this section. These terms are not meant to supersede the claims nor the definition of terms as defined within the four corners of the specification; but, rather, are meant to further the understanding of the invention and briefly introduce the technical art stage for a detailed teaching of the improvement in the art as provided by this invention as claimed.

Locking Sleeve

A slidable tubular sleeve of an internal diameter a few thousands of an inch or so larger than the external diameter of its strut strength member counterparts. In rough weather a user may fail to completely slide the sleeve away from the folding strut section, and by gravity or weather such sleeve may become lodged and pinched at the strut's folding joint with sufficient applied leverage by the strength members so as to cause structural damage.

Latching Detents.

Spring loaded balls which protrude partially through holes in sectional members, of a support strut. These detents retain the locking sleeve in place over an articulating bridge, thus locking the strut in an extended and taut position. In some installations the detent may be located so close to a strut securing fixture that the sleeve will not completely clear the detent in the unlocked configuration, with the possibility of the sleeve slipping into the joint and causing strut and/or framework breakage.

Articulating Bridge.

A short, relieved and shaped bridge (sometimes referred to herein as "link") which is hinge-pin connected at each end to identical, mirror image socket insert hubs. This articulating bridge, in concert with flat-faced mating socket hubs, creates a double knuckle two axis, foldable joint. Such bridges of my invention have a novel shape that bears against and automatically expels the slidable locking sleeve away from the folding joint.

Inserts (Sometimes Called Double Knuckle Hubs)

Relieved and shaped, but generally cylindrical, hubs of a snug fit diameter which are inserted into and fixed by pins to one member of a foldable two member strut. Such hubs receive and house the ends of a bridge cross piece of a novel configuration so as to provide safe and sure foldability for the joined strut sections. The bridge cross piece is uniquely shaped so as to not only expel the locking sleeve away from the joint location but also to provide an installation stop within the insert. Providing such hub inserts with a raised shoulder and an interior snug fit allows the hub to generally have the same outer diameter as the associated tube into which it is housed. This insert shoulder also contributes to my improvement features.

Foldable Strut.

In mechanical terms, a strut is a brace fitted into a framework to add strength and rigidity. For this invention the term strut is generalized to include both structural legs of a rigid tubing strength member. A strut further includes a foldable joint which includes a double knuckle geometry that allows the two portions of the strut to fold upon itself, in one plane only, or unfold into a straight straight configuration where the strut will become locked by a sliding sleeve.

Such a locked strut becomes a single rigid structural support member with improved compressive load bearing strength by virtue of a bridge and abutting faces of opposed inserts. That single strut member, in turn, locks other struts or fixture points in place within separate articulating framework members. (See Collapsible Covering below as one example of such framework.)

Axes of Rotation.

This invention provides two axes of rotation within the double knuckle insert of the foldable strut. In usage my foldable strut cooperates with two additional points of rotation at the outboard ends of the two strut portions. These outboard axes of rotation, or pivot points, are also the structural connecting points to a collapsible, skeletal framework. When a folding strut is extended and sleeve locked in place, both outboard axes of rotation become fixed by triangular geometry.

Collapsible Covering.

A generic term which includes awnings, bimini tops, dodgers, and other stretched coverings usually but not limited to weather exposed applications. A marine covering, by design, is taut when fixed in place over a rigid framework, generally of cylindrical tubing construction.

In marine applications such a framework is often pinned for a forward collapsing, articulating motion, and when opened, is held upward and rigid by straps in tension in the prior art. This articulating framework is usually configured with one or more crossway structural bows which have been inserted through stitched sleeves in a canvas or vinyl covering.

Installation Play

In marine applications a bow may spread across the deck of a small craft to which it is attached and have supports associated with the bow and the rest of the craft's weather covering. Installation of such struts requires a small amount of longitudinal over play to avoid any binding of the strut when the frame is being folded. This installation over play is sometimes referred to as "wobble" and is on the order of one-half an inch or so. Without some installation latitude, not only would the installation be difficult, but worse still the joint in certain geometries would have a tendency to bind during frame folding.

Bimini Top.

A canvas or synthetic covering stretched tautly over a skeletal framework. A temporary convertible covering usually positioned over an outside steering station on a powerboat or yacht.

Dodger.

A weather covering of canvas-like material stretched tautly over a curved, tubular framework on a dodger becomes a temporary convertible covering over the forward portion of a sailboat cockpit and affords weather protection to both the steering station and the companionway entrance. Given the more limited deck space of a sailboat compared to a power yacht, dodgers are shaped and fitted to attempt optimization of weather protection and entrance/egress.

BACKGROUND OF THE INVENTION

Articulating struts are well known and find many uses. Often such struts are manufactured in place as part of a customized larger equipment piece. Typical examples abound in the aircraft, space and marine and recreational industry. Often such struts employ many moving parts and are unusually complex for what—on the surface, or to a casual observer—is a seemingly simple and straightforward application. An aftermarket in these various technical disciplines exists, and such an aftermarket calls for field installable struts.

The marine recreation world, for example, broadly involves both sail and power boats. Such craft use canvas or synthetic fabric-covered apparatus extensively for protection from sun and rain. On power boats, these coverings are known generically as bimini tops and usually cover a substantial portion of a deck or outside steering station such as a flying bridge. Depending on weather conditions, these bimini tops are preferably foldable and collapsible, usually in a forward direction, such that an operator may raise or lower the covering for personal preference.

In the sailboat world, similar but smaller coverings—called dodgers—are used in much the same general fashion as the bimini tops. Sizes and shapes vary from boat to boat depending on specific deck designs which dictate attachment configurations. Field installation is prevalent for such craft and require foldable and collapsible struts.

DESCRIPTION OF PRIOR ART

Turning now to the prior art, a search prior to the filing of the parent application revealed various patents which are only of peripheral relevance. Such patents are listed in the soon-to-issue parent and need not be repeated here.

During prosecution of the parent, the Patent Office cited a Webster's dictionary definition ("detent") and the following patents: Rosane U.S. Pat. No. 5,217,315; Rankin U.S. Pat. No. 5,178,583; Kitamura U.S. Pat. No. 5,431,508; Miller U.S. Pat. No. 5,743,208; Pollen U.S. Pat. No. 5,803,104; Parson et al U.S. Pat. No. 4,865,064; Bolin et al U.S. Pat. No. 1,036,222 and Patchell U.S. Pat. No. 1,906,218. This art is listed for completeness sake and was clearly distinguished in the parent. Such art is believed to be of little relevance to the improvement structure described and claimed in this continuing application.

The present application covers a situation that develops when a bidirectional springless locking sleeve forms part of a foldable strut which is attachable at each end to strut-securing fixtures of a fixed-in-place covering such as a marine covering, an awning or the like. Such coverings often are subject to wind and nature's violence and thus require a quick and sure manual collapse/deployment under adverse conditions. Even skilled users familiar with such coverings may fail to properly latch out the sliding bidirectional sleeve and structural failure become imminent.

Indeed, on a pitching marine craft in extreme weather, it seems as if there are not enough hands to either properly set up or collapse such a covering. What is here presented—for the first time—is a new and improved offset insert for a pinned strut having superior strength, flexibility in the field, and self supporting rigidity together with installation convenience and versatility.

My novel insert and the resulting strut serves several functions including acting—in regards to a bidirectional sliding sleeve—as an expelling or "kick out" structure. I provide anti-pinch assurance, stops for installation advantages and other benefits which greatly reduce the opportunity for system failure.

SUMMARY OF THE INVENTION

Briefly summarized, the folding strut of this invention includes a strong pivoting connection link that is snugly fitted within a pair of opposed hubs, which hubs are themselves internally mounted in the proximate ends of a pair of hollow tubes or strength members. This connection link (or bridge) is seated in cutout hub portions, where it is pinned off-center to the hubs. My hubs each have step down flanges and are sized to snugly fit internally at the ends of a pair of opposed hollow cylindrical strength members of the same outside diameter. My hubs have a face-to-face contact area and stops for a limited amount of installation wobble.

Two spring-loaded detent push buttons manually position and hold a slightly oversized tubular sleeve which slides in place along the tubes and hubs. When the tubes and sleeve are extended into a straight (non folded) position the sleeve locks them in place. Manually depressing one or the other of the spring loaded detent buttons—and, sliding the oversized sleeve from either direction away from the hinged joint—allows the strut (and thus the two strength tubes) to fold back upon itself.

In some folding instances, the slidable locking sleeve could become caught at the knuckle/joint location as the strut folds upon itself; and if that "catch" is not eliminated the leverage arms in the strut section may cause considerable structural damage. My invention contains novel hub structure with offset center links provided with an internal kick out feature which will safely expel the locking sleeve from the joint in the event of an accidental pinch configuration.

In one embodiment my expulsion (or "kick-out") structure is on the link; and, in another embodiment, my expulsion structure is on a shaped central post portion of a shouldered hub insert, which post supports a pair of outside spaced links that sandwich a sleeve expelling contour of the center post. A raised peripheral shoulder on my insert hubs also contribute to the anti-pinch features of my invention. Pinch potential may be the result of an accident, oversight or error in usage.

My folding strut is readily installable with in-the-field tubing. An installer can go to a boat with a knuckle assembly, tubing and a tubing cutter and proceed with a custom installation. My double knuckle is designed as an stand alone insert assembly with mirror image load bearing faces. Such faces, when the strut is extended, bear against one another in compression. Foldable struts can be custom installed for stand alone windshields and folding hatch coverings.

Additionally, a hinge pin offset tends to make the extended strut strong and rigid. Such structure in combination with a bidirectional sliding locking sleeve which is positively expelled from the folding joint provides a highly improved and versatile anti-pinch strut.

My pre-assembled hinge consists of two opposing slotted and shouldered hubs with rounded slots centrally milled or injection molded in the opposed hub faces. These slots house a central connecting link that has mated rounded ends pinned for rotation at offset locations. A symmetrical protrusion at the longitudinal center of the link in the shape of a convex curve—ie., convex relative to the folding direction of the strut—bears against and thereby urges the slidable sleeve away from a pinch situation.

This convex curve provides both an installation stop to prevent pin breakage or potential sleeve crush during folding and an anti-pinching protection at the sleeve end. Thus, in this embodiment, the shape of the link itself assures that the sleeve will not become pinched or crushed during collapse/deployment of a covering formed with my improved strut system.

Additionally, in my injection molded central link inserts, I have provided a link with a deep rounded saddle which is recessed away from the opposed hub, and I have further provided a smooth rounded base at the bottom of the saddle. Such structure in operation in my improved strut develops a vertical "kick-out" force vector which urges the sliding sleeve away from any accidental sleeve pinching area.

When extended, the in-line link and hub slots are located along a longitudinal axis. The internally located hinge allows each tubular strut member to fold up to 90-plus degrees from its normal straight in-line position to a parallel side-by-side location when the strut is in a folded configuration. Hinge pins holding my bridge are offset from that longitudinal axis and serve as a convenient radius of curvature location. That location is also instrumental in providing a hub with a unique rounded center post that provides anti-crush, anti-pinch and pin protecting features as further explained in more detail hereinafter.

OBJECTS OF THE INVENTION

It is a object of the invention to provide a rigid structural joint member between two tubular bows pinned at either end and provided with anti-pinch movements and structure.

It is an object of the invention to provide an articulating knuckle having an anti-pinch link joining two strength members in a foldable strut.

It is an object to provide an articulating knuckle with two pivot points holding a connecting link having a shape which includes a convex central portion acting as a stop and a sleeve expelling surface.

It is an object to provide a convex-shaped knuckle with two pivot points which is constrained to articulate in only one plane.

It is an object to provide a two point ant-pinch knuckle which has a freedom of motion from 0 to 180 degrees in one plane.

It is an object of the invention to provide a strut with a bidirectional slidable locking sleeve that will not become pinched at the folding joint.

It is an object of the invention to a provide an efficient lockable strut with a slidable sleeve cooperating with two spring loaded ball detents and joint structure which avoid sleeve pinching.

It is an object of the invention to use a material such as stainless steel for marine environment usage.

It is an object of this invention to allow collapsing and folding of marine coverings without removal of canvas and free of sleeve pinching at strut joints.

It is an object to provide a knuckle and locking sleeve of anti-pinch configuration, which structure is field installable.

BRIEF DESCRIPTION OF THE DRAWING

FIG. 2 includes FIGS. 2A and 2B, with FIG. 2A being an exploded view in perspective showing my strut invention in extended straight line position; and FIG. 2B showing the strut in a non-exploded straight line position (but turned over in a gravity prone folding position which subjects the locking sleeve to gravity, setting up an operational mode that is susceptible to an accidental sleeve pinching problem as shown hereafter);

FIG. 3 includes FIGS. 3A, 3B and 3C, and is a partial cut away side view and front view of a typical marine application. Such Figures are helpful in explaining the advantages of the novel insert and improved strut of this invention when applied to the marine industry;

FIG. 6 includes FIGS. 6A and 6B wherein FIG. 6A is a side view of a deep saddle link of the FIG. 5C type and FIG. 6B is a cross sectional view taken along the lines A—A' of FIG. 6A;

FIG. 7 includes FIGS. 7A and 7B wherein FIG. 7A is a partial perspective view of my improved insert having a rounded central post and a pair of longitudinally split links, and FIG. 7B is a sectional view showing a link housing;

FIG. 10, includes FIGS. 10A and 10B, wherein FIG. 10A is a line drawing side view presentation showing a hatch section folded and a window section extended and upright.

DESCRIPTION OF EMBODIMENT(S)

Figure 1:
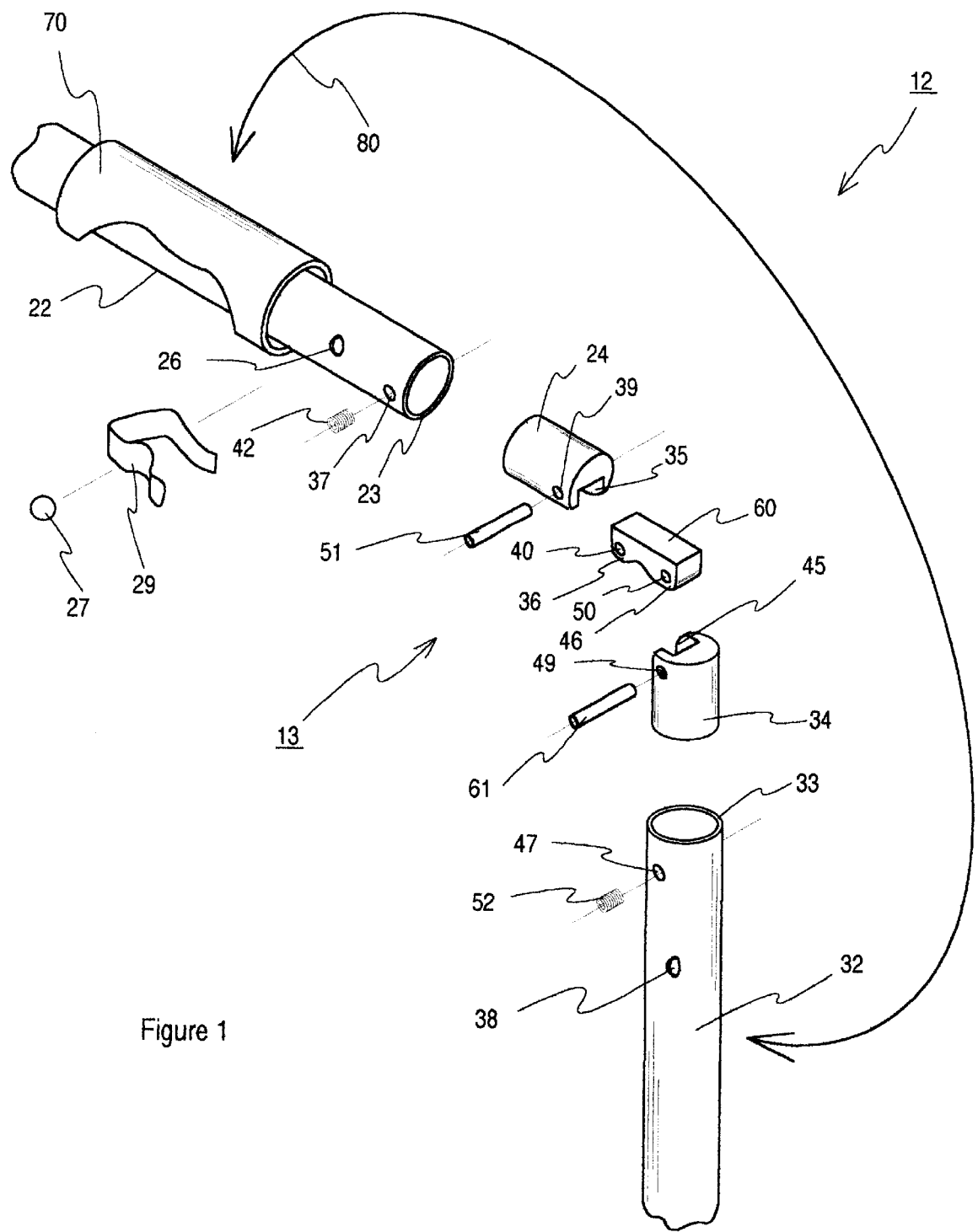
FIG. 1 is a front perspective exploded view showing my rightmost strut section articulated to approximately 90 degrees within the 180 degree single plane movement that is provided by my strut invention. Also exploded away are typical details of my ball detent.

Turning now to FIG. 1, a preferred embodiment of my foldable strut is shown in exploded view. Foldable strut 12 is comprised of two strength member legs 22 and 32. Although various materials may be used, in its preferred embodiment, I have found stainless steel tubing in the range of one inch outside diameter to be a good choice for the strength members.

Adjacent inboard ends 23 and 33 are each permanently fitted with a pair of identical hubs 24 and 34. These hubs are identical in shape and function, and are secured to leg ends 23 and 33 via set screws 42 and 52. These inserts may be either injection molded, machined material such as Delrin, or even stainless steel hubs on conditions I will further describe later herein. An all stainless steel strut model is particularly acceptable—indeed, almost mandatory—to the marine industry.

Various new synthetic materials are readily available for fitting within stainless tubing members 22 and 32. When such mixed materials are involved, however, such as synthetic Delryn and stainless steel tubes 22 and 32, there is an increased chance of stainless steel tubes 22 and 32, there is an increased chance of pinching of bidirectional sleeve 70 at the joint location 13. (Such a pinching problem will be explained in more detail with respect to FIGS. 4 and 5 hereof.)

The inward ends of bridge receiving hubs 24 and 34 are each provided with crosswise guide slots 35 and 45, best shown perhaps in FIG. 2B. Guide slots 35 and 45 may each be identically machined to receive fitted ends 36 and 46 of bridge 60. Likewise this bridge, or link, 60 may also be machined, injection molded or selected from stainless material.

Ends 36 and 46 of bridge 60 are drilled with holes 38 and 48 to receive axis roll pins 51 and 61. Corresponding holes 39 and 49 are drilled laterally through lower quadrants of hubs 24 and 34 to receive roll pins 51 and 61. Holes 39 and 49 are drilled for a press-fit with these roll pins.

With hub fittings and bridge assembled, my strut has a folding joint 13 which readily allows for strut 12 to fold back upon itself. Strut 12 easily articulates in a smooth, controlled manner in one plane, and one plane only, collapsing back upon itself, as may be required, as depicted graphically by arc 80 of FIG. 1.

Please, notice in FIG. 1 that detent ball 27 is held outwardly by spring 29 and is of such diameter with respect to its viewing hole 28 that a firm thrust of sleeve 70, FIG. 1, toward ball 27 easily retracts ball 27 allowing sleeve 70 to slide into place over inserts 24, and 34, as well as bridge 60 as better depicted in FIG. 2A and FIG. 2B.

As sleeve 70 bumps second ball 38 in leg 32, first ball 27 being spring loaded, pops out behind sleeve 70, effecting in-line capture at both ends of sleeve 70. Sleeve 70 is thus locked in place squarely over all folding elements of joint 13 FIG. 2B.

FIG. 2B shows sleeve 70 in place in partial cutaway over joint 13. With sleeve 70 locked in place, strut 12, becomes a rigid structural member, capable of carrying loads in either tension or compression. Continuing with FIG. 2B, strut 12 is in a straight and locked condition with leg 22 in line with leg 32.

As shown in FIG. 2B, hubs 24 and 34 and bridge 60 are laterally aligned, with flat face ends 81 and 82, respectively, of hubs 24 and 34 mated against each other in a straight and locked position. (Such faces are shown slightly separated for ease of understanding in the drawing but in practice bear against each other in order to absorb loads in compression.)

In order to better explain the marine use and novel features of my inserts and improved foldable strut, I have shown in FIG. 3A a marine sailboat dodger 100. Covering 95 is supported by semi-circular tubular bows 97, FIGS. 3A and 3B, running across deck 10. My struts 15 and 17 are shown integrated within the structural framework of a typical marine covering which includes a front windshield 115. The arc-like bows 97 may be several feet wide running across the width of a vessel.

Figure 9:
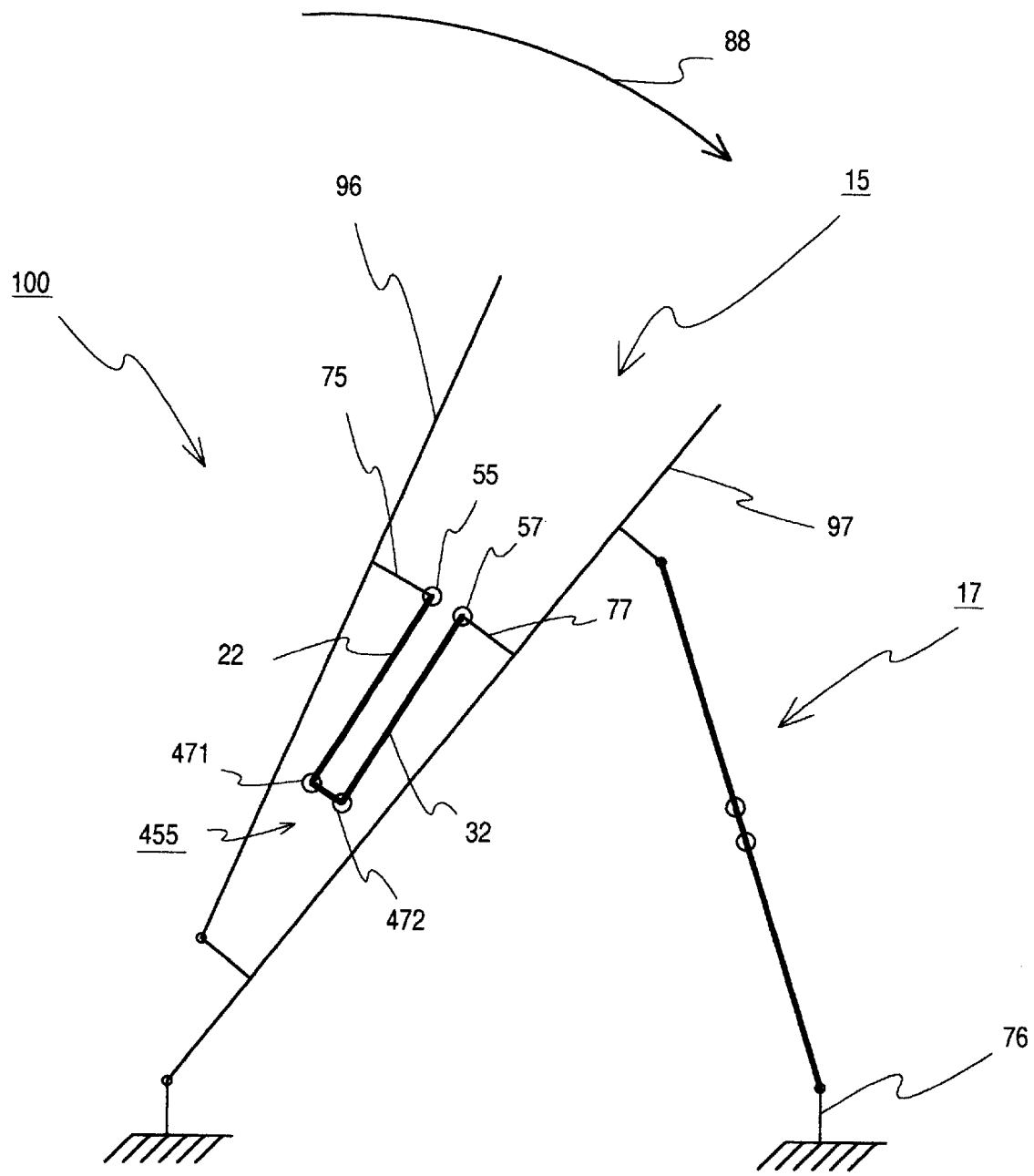
FIG. 9 is a diagrammatic line drawing (stickman view) helpful in further explaining anti-pinch and stop features of my invention.
Figure 11:
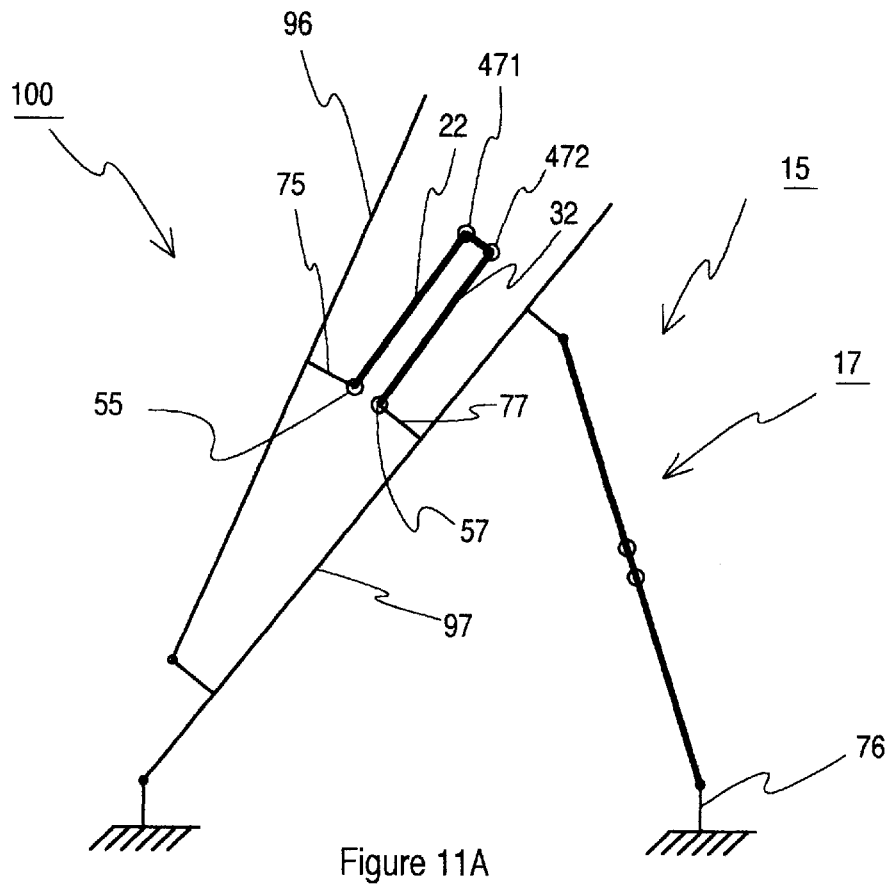
FIG. 11 includes FIGS. 11A and 11B both being line drawings presenting component parts of a marine covering—in accordance with FIG. 3—and includes two sets of struts in folded positions.
Figure 11:
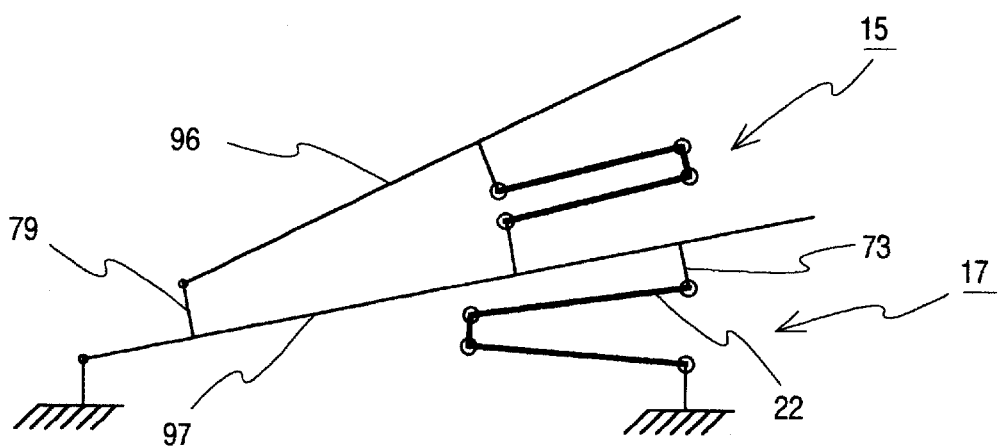

In FIG. 3A, strut 15 is shown in side view as forming a triangular truss with bows 96 and 97. A second, and matching triangular truss configuration is typically positioned on the opposite side of a two bow dodger 100. (Certain of these components including bows 96, 97 are also shown by the same numbers and described further herein with respect to other Figures such as FIGS. 9, 10 and 11.)

My strut 15 is positioned generally horizontally between dodger bows 96 and 97, which bows are typically angled to the deck 10 at about a 30 to 45 degree angle. Legs 22 and 32 of strut 15 are fitted with rigidly attached end caps 72 and 74 which are drilled for universal rotating pin attachments to receiving jaws 75 and 77. A common deck attachment cleat 79 is depicted at the bottom pedestal location 26. Cleats such as 76 and 79 are firmly affixed to deck 10 and thus hold dodger 100 in place on the vessel.

With struts 17 positioned as shown in FIGS. 3A and 3B, bow 97 will remain in an upright position and thereby provide an upright support for windshield 115 irrespective of the status of the triangular support including strut 15. Thus, the aft portion of the covering 95—between bows 96 and 97—may safely be collapsed into a forward position and clear the way for ease of entrance through a hatch below. Such a collapse in rough seas may bring about a pinch situation to be described in more detail hereinafter.

Additionally shown in FIG. 3B are a pair of forward struts 17, also attached to bow 97 at FIG. 3C by upward cap 71, receiving jaw 73 and pin 58. When manually installing an assembled strut by inserting pins—such as pin 58, FIG. 3C—at one end of the various support struts, an installer must have some play in the strut structure. These attachment jaws, such as jaw 73, are themselves ninety degree offset, and such offset adds to the complexity of the folding geometry.

Figures 4, 4A, 4B, 4C:
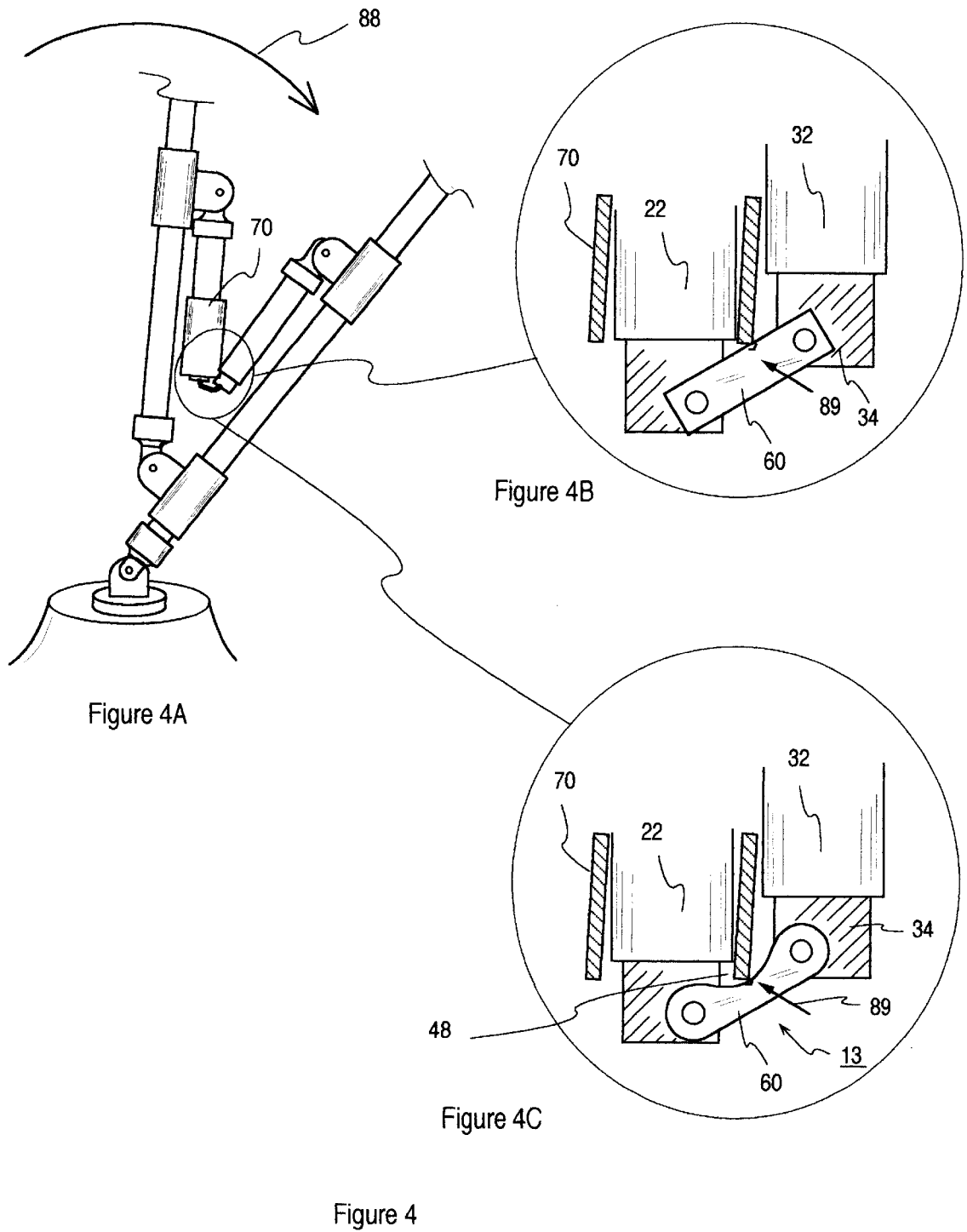
FIG. 4 includes FIGS. 4A, 4B, and 4C which are helpful in explaining a pinch problem solved by my invention.

FIG. 4 includes FIG. 4A which shows a partial collapse accomplished by manually sliding sleeve 70 away from the strut joint and pushing the covering skeleton forward as depicted by arc arrow 88. In certain instances—as a result of gravity—the installer may fail to fully move sleeve 70 above its position-holding detent ball. A potential pinch situation develops.

Digressing briefly, an example of a short strut and a long strut in a typical marine operation is shown in FIG. 10A. Strut 22 may be so short as to allow folding but yet not allow sleeve 70 to clear both the joint and its holding detent. Thus, strut 22, will still fold provided that my invention is employed to prevent structural damage should the edge of sleeve 70 be left at the joint location during fold.

Returning now to FIG. 4, the enlargements at FIGS. 4B and 4C are respectively useful in further explaining the nature and solution of pinch and stop problems associated with such usages. FIG. 4B depicts sleeve 70 dropped into joint 13 where its blunt end has been "pinched" by a typical rectangular link 60. That pinch is exemplified by arrow 89. Should the covering skeleton be collapsed further, a high leverage force will be developed in the area of arrow 89 and breakage—most likely to the orthogonal pins or hub shoulders—almost surely will take place.

Note, in FIG. 4B, that sleeve 70 has tipped and is binding against tube 22. Tube section 32 is also pressing on tipped sleeve 70 and bridge link 60 is increasing in tension. Depending upon the length of the particular tube section 22, a large moment arm force develops at the pinch location of arrow 89. When too much tension is developed breakage will occur.

Figure 5:
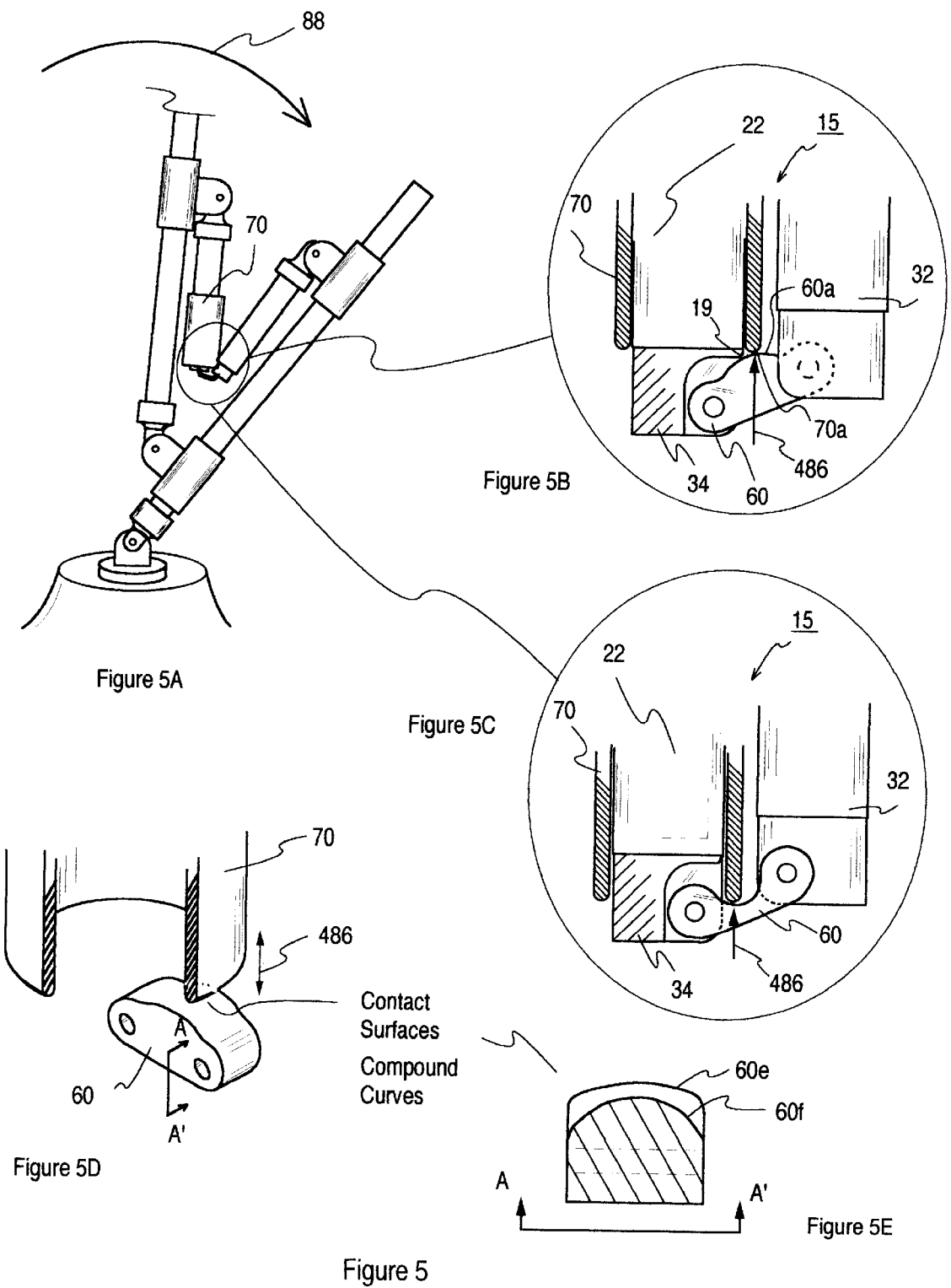
FIG. 5 includes FIGS. 5A, 5B, 5C, 5D and 5E, which views are helpful in explaining my inventive solution to the sleeve pinching problem of FIG. 4.

In my invention, I have solved these problems by novel shaped "kick-out" structure for my links and for my hubs as shown in FIG. 5. (FIG. 5A is the same as FIG. 4A and has been repeated for clarity sake.)

FIG. 5B depicts one solution wherein my link 60 is provided with an upper convex (humped) surface 60a that will come into contact with the lower rounded surface 70a of sleeve 70. That lower sleeve surface 70a has a full radius round which "rides" against the curved surface 60a of link 60 as strut 15 is being folded in a forward direction. This rounded convex and rounded sleeve structure places two rounded surfaces in continuous contact, which contact results in a sufficient vertical force component to move sleeve 70 upward and away without possibility of a pinch.

Arrow 486 of FIG. 5B symbolically depicts this rounded surface cooperation in the expulsion of sleeve 70 upward and away from the pinch position. Forward and aft symmetry of the convex curve 60a about the midpoint of bridge link 60 assures that it will "kick-out" a locking sleeve 70 in the same fashion for sleeve drop on either side of strut 15. (It should be understood that such symmetry for the same reason applies to all of my novel links.).

Please note that convex curve 60a also serves as a stop when it bears against the shoulder surface 19 of insert 34. That stop 19 prevents the folding action from going beyond the fully folded position wherein tube sections 22 and 32 are parallel to each other.

Stop 19 also controls the amount of vertical play or wobble that will be allowed in a vertical direction. Thus, stop 19 is valuable in an installation mode.

When an installer is installing the hub invention in the field, pin 58 of FIG. 3C must be inserted into a skeleton fixture. There must of necessity be some limited longitudinal play in a fully assemble strut in order in order to assure an efficient installation. The finalized covering framework will, nevertheless be rigid.

FIG. 5C depicts a second "kick-out" embodiment wherein link 60 is deeply saddled with a recessed concave shape. (Concave, again references the fold direction of the strut.) Please compare FIG. 4C and FIG. 5C. The links are somewhat similarly shaped but one saddle depth (FIG. 4C) contributes to a pinch problem whereas FIG. 5C shows a deeper saddle depth that solves the pinch or breakage situation.

In order to more fully appreciate the novel solution wherein a seemingly small change achieves unexpected results, FIG. 6 amplifies on the above described situation. FIG. 6 presents my injection molded model with a central link which may be chosen from a different material than the hubs. The dashed lines show the hollow void for my hubs 24, 34. Sectional arrows A—A' depict a cross sectional end view of the bottom of the saddle of link 60, FIGS. 5C and 6B.

In FIG. 6C, one may readily appreciate that the top surface 60e of the link 60 is a rounded surface that will ride against a downward rounded surface of sleeve 70. Arrow 486, FIG. 6A depicts an upward force vector that develops in order to alleviate the pinch problem for the depending edge of sleeve 70.

The rounded shape 60e at the base of saddle 60d forms a more complex rounded surface that better follows the actual movement of the strut members as folding and unfolding takes place. Actual folding movements have shown that surface (60d) bears against the rounded sleeve surface (70a) and they likewise develop a vertical force component 486 which tends to move sleeve 70 away from the pinch area.

Returning to FIG. 5D a perspective view in partial cutaway of the lower portion of sleeve 70 is shown. Also depicted, in FIG. 5E, is my double compound curved surfaces 60e, 60f for link 60. I have determined that such double compound upper kick-out surfaces have additional protection capabilities for expelling sleeve 70 away from a pinch situation.

A highly amplified and exaggerated perspective sector cutaway of A—A' shows my double compound surface 60e as it transitions into 60f in FIG. 5E. Providing such a double compounded surface 60e into 60f for link 60 assures that the lower part 70a of sleeve 70 (depicted partially cutaway, in FIG. 5D) is generally encountering some curved portion of the double compound surfaces 60e, 60f which provide a vertical force component 486 of sufficiently high force so as to assure an anti-pinch feature for my invention.

Figure 7:
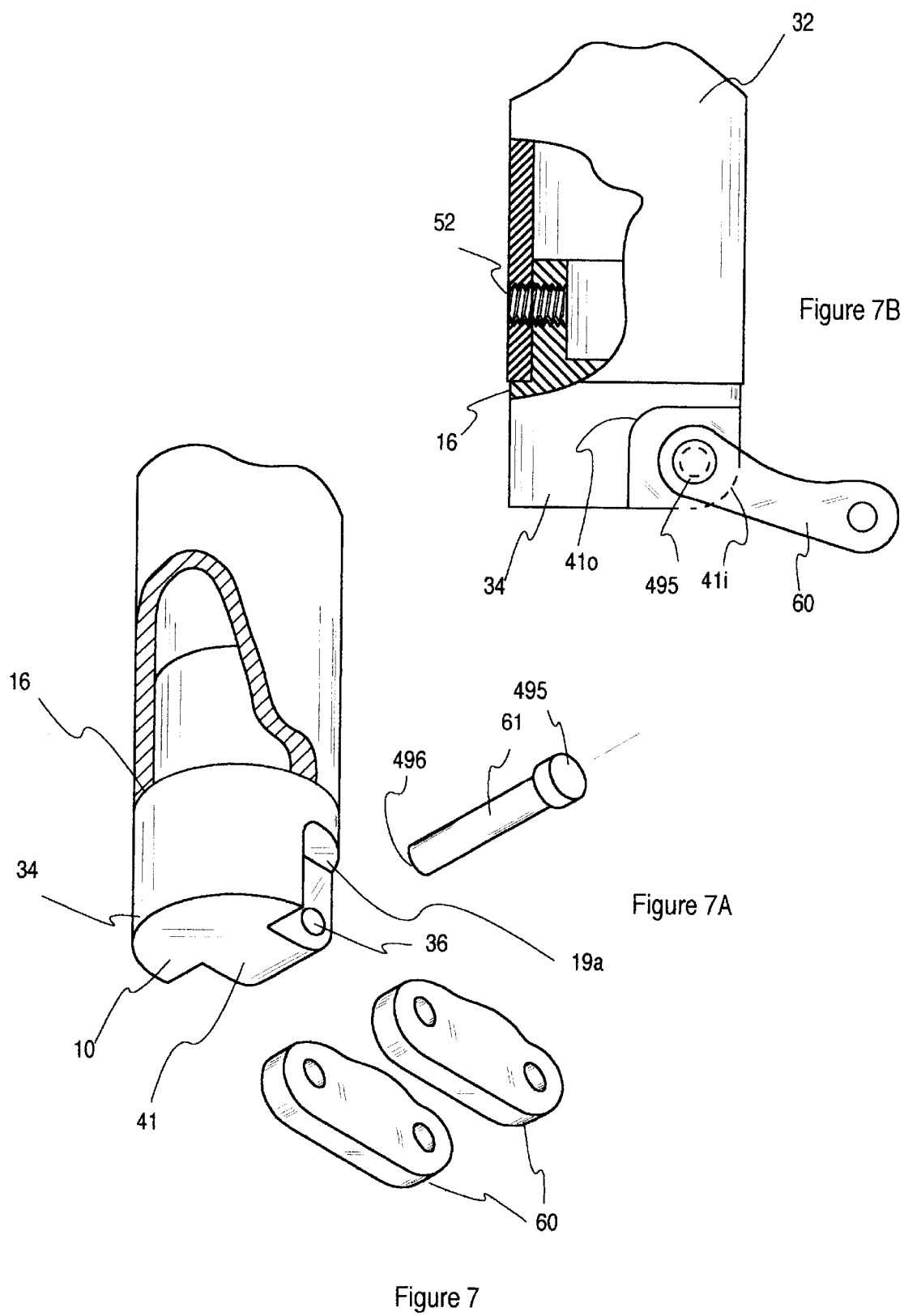

In the FIG. 7 embodiment of my invention, the connecting link 60 is longitudinally divided as a split pair with one link each of the pair pinned in cut-out locations 19a formed in my hub 34 on either side of a central post portion 41. These cut-outs 19a may easily and advantageously be formed by milling a flat and a radius of curvature of the shape generally as shown into the inboard end of the hub stock from which insert 34 is to be formed.

The milled central post 41, thus formed, has both an inboard recess 41i and an outboard recess 41o formed as radius of curvatures in FIG. 7B. Pin 61 has a brad at end 495 that holds link 60 in place at the center post 41. End 496 of pin 61, once inserted through a pair of sandwiched links 60 is bradded over to assemble the links 60 to a pair of opposed inserts such as 34.

The center for inscribing the inboard radius 41i may conveniently be positioned at (or somewhat tangentially aft) of the center of the pin location 36. This inboard radius of curvature 41i guards against pinching sleeve 70 at the folding joint.

More importantly, if the bidirectional sleeve 70 does not manually clear the folding joint, the inboard radius 41i of this central post 41 bears against—and with a wiping cam action—expels the sleeve 70 as the outer strut members completely fold back against themselves. This wiping action will be described with reference to FIG. 8.

It should also be understood, that in the marine environment, stainless steel is a preferred strut material. But, it is prohibitively expensive to try to mill out an all-stainless hub insert for a recess slot 35, such as was described for my FIGS. 1 and 2. Accordingly, I have divided my link longitudinally and have set one link on each side of a central post 41. This post is formed by milling out a flat right angle sector on both opposed side portions of my hub insert 34, FIGS. 7 and 8. Such outside milling is more cost effective.

Thus, to blend my knuckle attributes with stainless materials, I have divided my link 60 into two parts that are stamped out and are pinned on opposite sides of a central projecting post 41. More importantly, the inboard radius 41i of the central post 41 is chosen so as to wipe against the slidable locking sleeve 70 and expel it from the folding joint.

Figure 8:
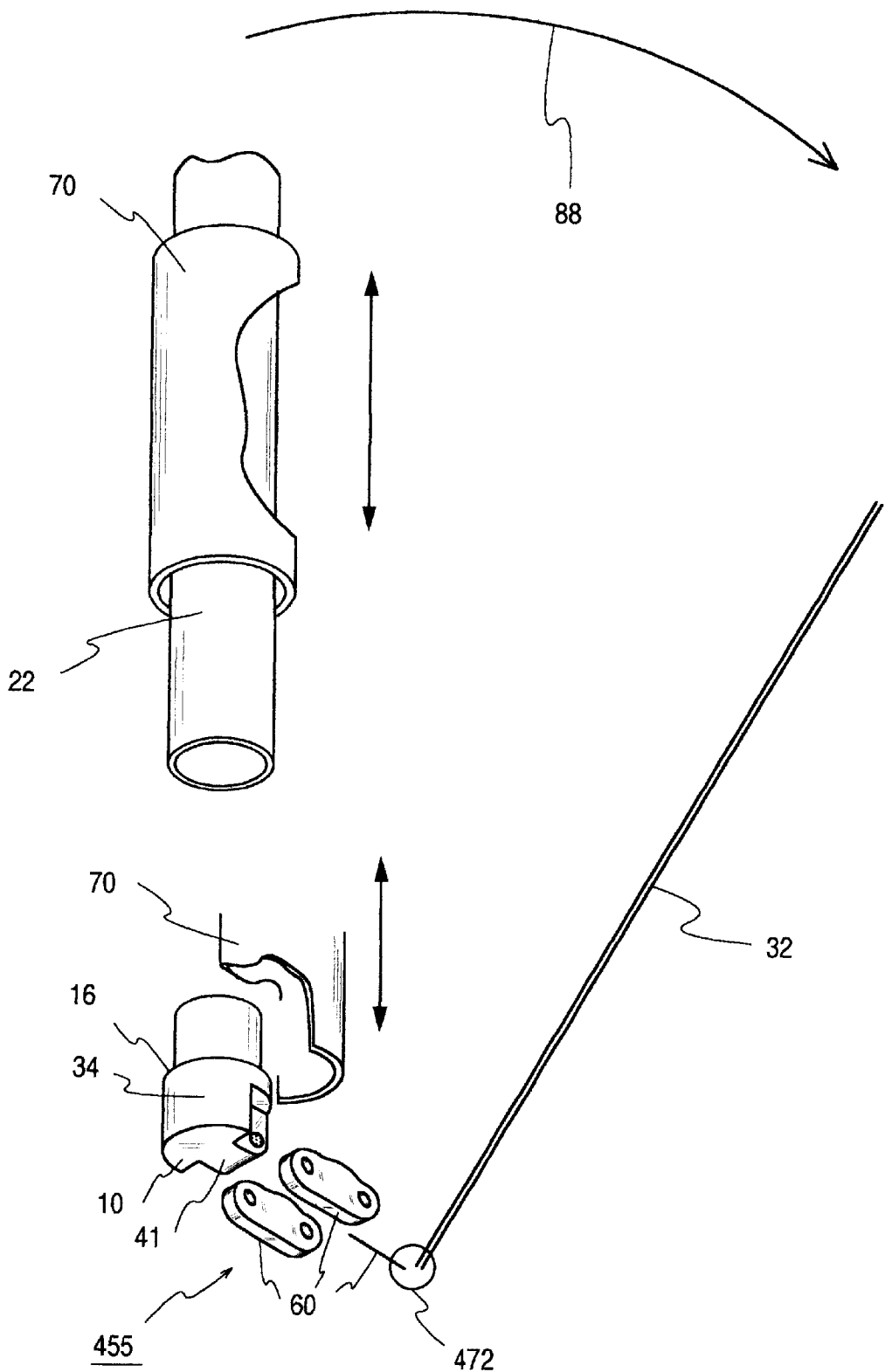
FIG. 8 is a front perspective in exploded view of the insert embodiment of FIG. 7 in which one leg of the inventive strut is shown in "stickman" presentation.

FIG. 8 depicts an exploded view that helps explain such cam-like wiping action. In FIG. 8, locking sleeve 70 is sliding on strut leg 22 which allows the strut to fold as depicted by the line schematic and arc 88. (Also, please see FIG. 10A wherein the folding joint is numbered 455 in FIG. 8 and the joint is shown as two separate circles 471 and 472 to agree with the presentation and numbering of FIGS. 9, 10 and 11.

Should sleeve 70 drop down into the danger zone, then as shown by the partial perspective, sleeve 70 is wiped back up and away from the links 60 in the manner shown in simplified fashion in FIGS. 10A and 10B. An all stainless model is smooth by nature and that smoothness facilitates my anti-pinch features.

As earlier described in detail, jaw 75 in FIG. 3A is fixed to a section of bow 96, and that bow 96 is also rotationally pinned at 55. Bow 96, by geometry, folds forward under the guidance of folding strut 15. In such a forward folded configuration, the remainder of dodger 100 including bow 97 is maintained as a functional rigid structure by my struts 17, FIG. 3B.

This unique one-section-only folded configuration as shown in FIG. 11A, conveniently clears a hatch while leaving a windshield support structure (as shown and described previously in FIG. 3) in a preferred structurally rigid and upright position. This is a highly advantageous feature which the prior art cannot offer. When the stop and anti-pinch features are incorporated into my struts via my new and novel inserts, an improved structure is provided that is not at all suggested by any known art.

Additionally strut 15, folded in its upward or downward direction (FIGS. 9, 10A, 11A) also helps support the gatherings of an aft section of canvas on either side. Such selective folding enhances windshield visibility and presents another valuable feature of my invention.

Moving on to FIGS. 11A and 11B, struts 15 and 17 are now shown folded. Leg 22 of strut 17 is rotationally attached to jaw 73 which is in fixed communication with bow 97. Thus, the windshield section of bow 97 has now folded downward, also carrying the previously folded hatch section downward also. Notice in FIG. 11B, that strut 17 is folded inward, and in a direction opposite to strut 15. In the case of a windshield section, such a direction causes minimal interference with a folding clear windshield section.

In summary, FIGS. 11A and 11B present fixed, but folding, windshield options with folded hatch options that are damage proof from the folding deployment modes. These features cannot be accomplished by the prior art. Lastly, with my self-supporting strut system, and dodger skeleton, a covering may be snap configured such that no center bow attaching loops are required as explained in more detail in my parent application. Thus, in longer periods of good weather the canvas can be easily unsnapped and stored, again unlike the prior art.

While my invention has been described with reference to a particular example of a preferred embodiment, it is my intention to cover all modifications and equivalents within the scope of the following claims. It is therefore requested that the following claims, which define my invention, be given a liberal interpretation which is within the spirit and scope of my contribution to this strut and marine covering art.

What is claimed is:

1. A knuckle having a pair of opposed face hub inserts fixable into a hollow strut with a central longitudinal axis, an outside diameter and strength members adaptable for secure attachment between two fixed points, the knuckle including an articulating joint formed by the inserts which are hinged together by a link pinned to the inserts at a position offset from the longitudinal axis, which knuckle when fixably inserted in proximate ends of the strut, allows the strut single plane movement from a folded back-on-itself position to an extended in-line position, such strut either being locked or unlocked by slidable movement of a bidirectional sleeve which has an inside diameter slightly larger than the outside diameter of the strut so as to ride along the strut between the attachment points, which locking sleeve by gravity or improper operation may have an end thereof lodge in said knuckle, the improvement comprising;

anti-pinch means formed in said knuckle with one or more rounded surface(s) in moveable contact with said bidirectional sleeve for moving said sleeve away from said knuckle.

2. A knuckle in accordance with claim 1 wherein the rounded end of said sleeve further comprises:

a full radius of curvature relative to the thickness of the wall of the sleeve.

3. A knuckle in accordance with claim 2 wherein said anti-pinch means further comprises:

said link having a longitudinal center portion in the shape of a convex curve relative to the fold direction of said strut with the apex of that convex curve located between the two insert faces when said link and inserts are assembled within said strength members.

4. A knuckle in accordance with claim 2 wherein said anti-punch means further comprises:

said link having a longitudinal center portion in the shape of a concave saddle surface relative to the fold direction of said strut with the bottom of the saddle thereof located between the two insert faces when said link and inserts are assembled within said strength members.

5. A knuckle in accordance with claim 4 wherein said concave saddle, located at the bottom thereof, further comprises:

an orthogonal radius of curvature of the top portion as viewed in cross section.

6. A knuckle in accordance with claim 5 wherein said concave saddle further comprises:

a double compound curved surface which continuously encounters some curved portion of the bottom of the sleeve as the sleeve moves away from the link.

7. A knuckle in accordance with claim 1 wherein installation of said strut in a larger framework requires a small but limited amount of longitudinal movement of said strut members, and said insert further comprises:

said recess in said insert includes a shoulder thereon; and said convex curve has a stop portion thereof coming into contact with said shoulder to restrict longitudinal movement of said strength members to a predetermined amount for installation.

8. A knuckle in accordance with claim 1 wherein said insert hub comprises:

a central post formed in the forward facing portion of the insert by cut-outs in the shape of a longitudinal flat surface opening into the face of the insert; and said link comprises a split pair of link sections one link section each on either side of said central post.

9. A knuckle in accordance with claim 8 wherein said central post further comprises:

an outer radius of curvature protecting against pinching of the sleeve.

10. A knuckle in accordance with claim 9 and further comprising:

said radius of curvature is formed in said post by an inscribing center positioned at or somewhat tangentially aft of the center of the pin location.

11. A knuckle in accordance with claim 10 and further comprising:

the outer radius of curvature forms a contact surface which bears against said rounded sleeve end with a wiping cam action which tends to move said sleeve away from said link.

12. A knuckle in accordance with claim 1 and further comprising:

an all stainless steel model.

13. An articulating strut which exhibits, when extended, a central longitudinal axis and a potential sleeve pinch at a folding joint for said strut, said strut comprising:

a pair of stiff tubular strut members having proximate hollow ends;

a pair of identical but opposed hub inserts that are fixably insertable into said hollow ends of said tubular members, which hub inserts on the inboard ends thereof each have inboard faces and a longitudinally positioned bridge rotation slot relieved therein;

a bridge cross piece rotatably set into said bridge rotation slots, said cross piece having orthogonal pin receiving holes;

hinge pins orthogonal to and offset from said longitudinal axis securing said bridge to said insert hubs and permitting said tubular members to extend into a straight position which causes said inboard faces of said inserts to be in contact with each other;

a freely slidable bi-directional sleeve which may be manually slid from either direction along said tubular members and over said bridge and hub inserts to lock same as an extended strut and wherein said sleeve, during a folding operation, may become pinched in the folding joint; and means at said folding joint for expelling said sleeve away from the joint as strut folding takes place.

14. An articulating strut in accordance with claim 13 and further comprising:

said tubular members consisting of two rigid cylindrical tubes;

each tube having located therein detent balls that are spring loaded for holding said sliding sleeve in position over said bridge and inserts when said strut is in an extended in-line configuration.

15. An articulating strut in accordance with claim 13 and said hinge means further comprises:

a flat hinged cross piece with rounded mating sockets set into said rotation slots and secured therein by orthogonal pivot pins in order to create a double knuckle, two axis, folding joint; and wherein said anti-pinch means
 includes a convex upper contact surface which bears against a rounded end of said sleeve in order to develop a vertical force vector which tends to move the sleeve away from the pinch position at said joint for said strut.

16. An articulating strut in accordance with claim 15 and said bridge further comprises;

a generally rectangular shape having rounded rotation corners for said bridge on the folding side of said hinge; and a folding space formed between said rounded rotation corners for housing said tube ends and said sleeve when said strut is fully folded, said space being large enough to allow the folded members to move back and forth for field installations, and yet maintain parallelism.

17. An articulating strut for coverings having an attachable strut-securing fixture at each end of said strut for securing said strut between two fixed points, said strut exhibits, when extended, a central longitudinal axis lying on the center line of a longitudinal center line plane, and said strut also having a folding plane orthogonally located relative to said center line plane, said strut being manually collapsible between said fixed points in adverse weather conditions and comprising:

a pair of stiff tubular strut members consisting of two hollow rigid cylindrical tubes having proximate ends;

said tubular member pair adapted at each remote end for connection to strut-securing fixtures of a covering of which said strut is an integral part;

a pair of identical but opposed hub inserts that are fixably insertible into said proximate hollow ends of said tubular members, which hub inserts on the inboard ends thereof each have partially relieved in the lower portion thereof a bridge rotation slot longitudinally positioned essentially from about the center line of each hub through the lowermost surface of the hub insert with the upper portion of said inboard ends of said hubs being non-relieved;

a bridge cross piece rotatably set into said bridge rotation slots, said cross piece having two orthogonal pin receiving holes, which holes are offset below the centerline of said longitudinal axis;

hinge pin means orthogonal to and also offset from said longitudinal axis for securing said bridge cross piece to said insert hubs for an arc rotation in said folding plane from 0 to 180 degrees only, thus permitting said tubular members to extend from a folded position of 180 degrees into a straight position of 0 degrees causing the inboard non-relieved faces of said inserts to be in face-to-face contact with each other;

a freely slidable bidirectional sleeve which is non-removable from said strut but which may be manually slid from either direction along said tubular members toward or away from said strut-securing fixtures to either lock same as an extended strut for deployment of said covering or to permit said strut to fold for collapse of said covering;

each tube having located therein detent balls that are spring loaded upwardly beyond the ends of said sleeve for holding said sliding sleeve in locked position over said folding cross bridge piece when said strut is in an extended in-line configuration;

said detent balls being manually depressible thus permitting said bidirectional sleeve to slide from either direction in order to unlock said bridge piece and thus allow said strut to fold back upon itself while said strut remains fixed at each end; and said hub inserts being further characterized in that either said hubs or said link have rounded surfaces which bear against a rounded end of said sleeve so as to tend to move said sleeve away from said joint during folding.

18. An articulating strut in accordance with claim 17 wherein said strut has a pair of ends remote from said bridge with each remote end being fitted with end caps for a single plane pivoting connection at strut-securing fixtures, said strut further comprising:

a collection of tubular bows creating a structural skeleton over which is stretched a form fitting weather protective covering for a small marine craft;

a windshield and an aft deck covering formed by said tubular bows; and said pivoting connections of said strut further comprising receiving jaws and cap eye attachment fixtures forming pivotable attachment points for connecting remote ends of said folding strut in said structural skeleton; and said struts together with said bidirectional sleeves permitting said covering to be folded either with said windshield up in place or with said windshield and said deck covering foldable to the deck of said craft.

19. An articulating strut in accordance with claim 18 wherein the rounded end of said sleeve further comprises:

a full radius of curvature relative to the thickness of the wall of the sleeve.

20. An articulating strut in accordance with claim 19 wherein said anti-pinch means further comprises:

said link having a longitudinal center portion in the shape of a convex curve relative to the fold direction of said strut with the apex of that convex curve located between the two insert faces when said link and inserts are assembled within said strength members.

21. An articulating strut in accordance with claim 19 wherein installation of said strut in a larger framework requires a small but limited amount of longitudinal movement of said strut members, and said insert further comprises:

said recess in said insert includes a shoulder thereon; and said convex curve has a stop portion thereof coming into contact with said shoulder to restrict longitudinal movement of said strength members to a predetermined amount for installation.

22. A knuckle in accordance with claim 21 wherein said anti-pinch means further comprises:

said link having a longitudinal center portion in the shape of a concave saddle surface relative to the fold direction of said strut with the bottom of the saddle thereof located between the two insert faces when said link and inserts are assembled within said strength members.

23. A knuckle in accordance with claim 22 wherein said concave saddle, located at, the bottom thereof, further comprises:

an orthogonal radius of curvature of the top portion as viewed in cross section.

24. A knuckle in accordance with claim 23 wherein said concave saddle further comprises:

a double compound curved surface which continuously encounters some curved portion of the bottom of the sleeve as the sleeve moves away from the link.

\* \* \* \* \*